March 12, 1968

T. YEATER ETAL 3,372,832

REMOVABLE COVER FOR CONTAINERS

Filed June 17, 1966

United States Patent Office 3,372,832
Patented Mar. 12, 1968

3,372,832
REMOVABLE COVER FOR CONTAINERS
Thomas Yeater and Doris J. Smith, both of 4021 W. Fay Circle, Santa Ana, Calif. 92703
Filed June 17, 1966, Ser. No. 558,303
7 Claims. (Cl. 220—29)

The present invention relates to closure means for containers and more particularly to a cover which can be attached to the top of a food or beverage tin can after it has been opened, and can be employed for selectively dispensing food or beverage therefrom.

Present practice of opening canned food or beverage tin-can containers is to use a can opener to remove the top part of the can or punch two diametrically opposite holes in the container top for dispensing, respectively, food or beverage therefrom. When all of the food or beverage has not been consumed, the remainder is left in the can whose inside plating would be amenable to chemical reaction with the food or beverage when the can is left open and exposed to air. Even when the open container with the food is placed in a refrigerator to preserve the contents, undesirable odors may leave the can to contaminate the atmosphere in the refrigerator chamber. Or, the air entering the container may cause spoilage of the contents thereof, so that the food or beverage is unfit for further consumption. To eliminate such food spoilage or contamination of the refrigerator atmosphere, the present invention provides means for sustaining freshness of the food or beverage and for enabling the dispensing of same in amounts as desired.

An object of the invention is to provide a removable closure cap or cover adapted to be accommodated on the top part of a food or beverage can which has been previously opened.

A further object of the invention is to provide an aperture in said closure cap and a removable plug member hinged thereonto to cover and uncover said aperture.

A still further object of the invention is to provide an air duct in said closure cap so that when it is placed on the opened container the duct establishes air intake into the container when said hinged plug is pulled out for dispensing the contents of said container.

Another object of the invention is to provide on the periphery thereof an internally formed flange which fits over the crimped periphery of the food or beverage can to substantially secure said cap or cover thereon.

Figure 1:
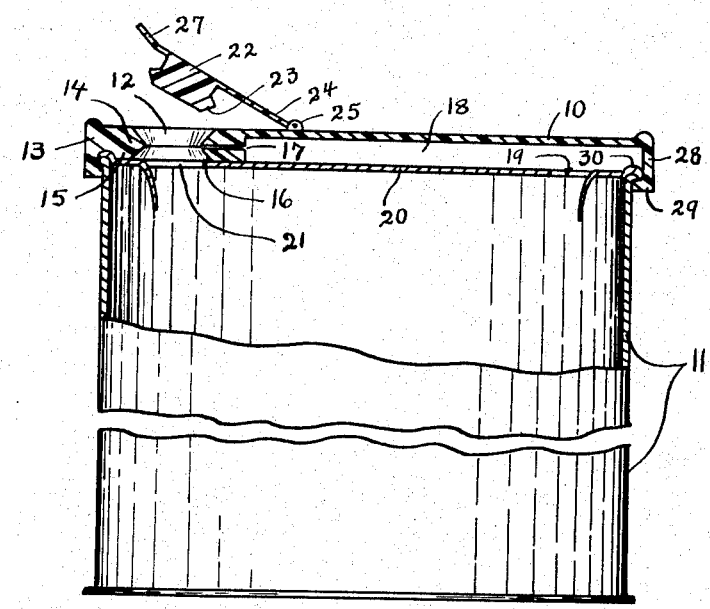
Figure 2:
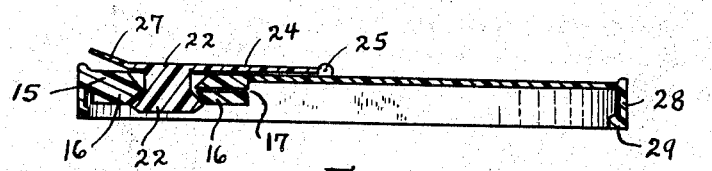
Figure 3:
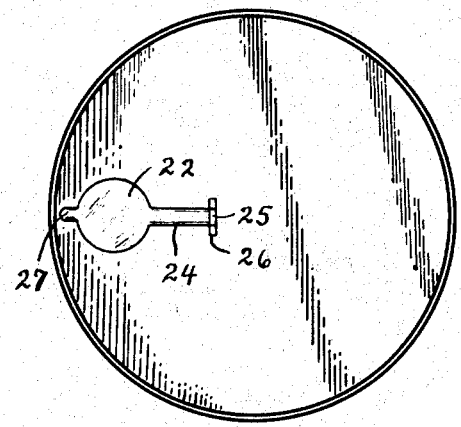
Figure 4:
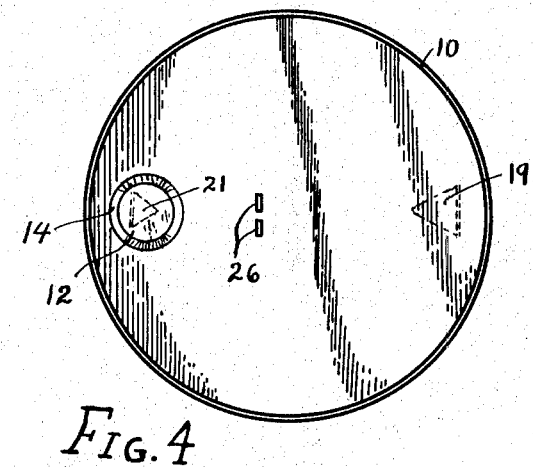

Other objects and advantages of the invention reside in its simplicity of construction, ease of attachment and removal from the container top, and low cost of manufacture; these and other advantages of the invention will be more fully understood from the following description taken in conjunction with the accompanying drawing, in which like numerals refer to like parts throughout the several views of the invention, and in which:

FIGURE 1 is a partially cutaway side view of the removable cover, illustrating the manner it is attached to a food or beverage container, FIGURE 2 is an isolated view of the removable cover member sectioned at line 2—2 of FIGURE 3, FIGURE 3 is a top view of the cover member, and FIGURE 4 is also the top view of the cover member, with the plug member removed to show the configuration of the aperture thereunder.

Referring to the drawing, the invention comprises a closure cap member or cover 10 made of plastic, polyethylene, rubber, or the like. We prefer to employ polyethylene in the entire construction of the closure member because polyethylene offers great resiliency yet is sufficiently stiff to retain its shape properly when the closure member is attached to the top of a food or beverage can, such as the one designated by numeral 11. An aperture 12 is formed in the closure member 10 adjacent the rim 13 thereof. The annular rim 14 surrounding the aperture 12 is formed thicker than the general thickness of the closure member 10, and is doubly beveled as at 15 so as to form a constricted middle section 16. A small-diameter bore 17 is provided in the constricted middle section 16 and is directed from aperture 12 toward the center of the closure member 10.

The bore 17 has an essential function; it permits air to enter into can 11, via chamber 18 and hole 19 punctured in the top section 20 of can 11, during dispensing of the contents thereof through a second punctured hole 21 in top section 20, with the aperture 12 in register with hole 21. Without the entrance of air through bore 17 into the can 11 (for venting it), it will be difficult for the contents of the can 11 to be dispensed therefrom, because a vacuum action will be created in chamber 18 which will prevent the liquid contents of the can 11 from being removed therefrom.

For sealing the can 11 hermetically, a plug member 22 is provided in the closure member 10 to cover and uncover the aperture 12. When the aperture 12 is covered with the plug member 22, the contents of the can 11 is hermetically sealed from the atmosphere. The plug 22 has a beveled section 23 which is adapted to be accommodated in aperture 12, causing mutual contact of the faying surfaces of the respective beveled sections of rim 14 and plug member 22, as illustrated in FIGURE 2. An extension 24 is formed on one side of the periphery of the plug member 22 and is provided at the terminal end thereof with a male hinge means 25 which mates with a female hinge section 26 formed in the body member 10 to complement the hinging mechanism. Thus, the plug member 22 can be swung on the hinge up and down for respectively opening and closing the aperture 12. A flange 27 is formed on the plug member 22 and is disposed diagonally opposite to said extension 24. The flange 27 serves for pulling the plug member 22 open for dispensing the contents of the can 11 through apertures 21 and 12.

The closure member 10 is provided with a peripheral skirt section 28 having an annular flange 29 projecting inwardly so as to secure the closure member 10 on the can 11 by the peripherally crimped rim 30. Since the polyethylene closure member 10 is pliable, the flange section 29 will expand sufficiently outwardly to allow it to be fastened over the rim 30 for securing the closure member snugly thereon.

For using the closure member 10 on a beverage can, the top section 20 of can 11 is punctured to form two diagonally opposite holes, 19 and 21, in the usual manner as for puncturing holes on top of a beer can preparatory to dispensing of its contents. The closure member 10 is inserted over the can top so that the aperture 12 is in register with the aperture 21. The cap 22 is opened by pulling on flange 27, and after a desired amount of the beverage is dispensed from the can 11, the cap 22 is closed by pressing thereon. Such a closure thus prevents the contents of the can 11 from exposure to the atmosphere or any contaminant from outside of the can.

For removing thick food contents of the can in desired amounts, the entire cap section 20 of the can 11 is first removed with a can opener. After a desired amount of the food is removed from the can, the closure member 10 is inserted on the cap top. For dispensing the remainder of the food content of the can 11, the entire cap member 10 is removed. The cap or closure member 10 can be washed, dried, and reused on other food or beverage cans, as necessary.

Having thus described a preferred embodiment of the invention, it is to be understood that certain modifications in construction, arrangement, and material may be incorporated into the invention, as desired, without departing from the spirit and scope of the invention as hereinafter defined in the appended claims.

We claim:

1. A removable closure cap adapted to be secured on a food or beverage tin-can container, comprising a pliable discal means with peripheral skirt terminating in an inwardly projecting means for hermetically sealing said discal means on said container after the top thereof is opened, liquid-dispensing means incorporated in said discal means for disposal of the contents of said container, and means formed in said liquid-dispensing means and disposed between said container and said discal means for venting said container during dispensing of the contents thereof through said liquid-dispensing means.

2. A removable closure cap adapted to be secured on a food or beverage tin-can container as defined in claim 1, wherein said pliable discal means with peripheral skirt terminating in an inwardly projecting means being a polyethylene closure cap with said inwardly projecting means being an annular ring formed into the terminal end of said skirt to secure said closure cap on said container by snapping over the crimped peripheral rim thereof.

3. A removable closure cap adapted to be secured on a food or beverage tin-can container as defined in claim 1, wherein said liquid-dispensing means comprising an aperture formed adjacent the periphery of said closure cap, a plug member to cover and uncover said aperture, a hinge means securing said plug member at one end thereof to the top of said closure cap, and a flange means incorporated on said plug member in opposite relation to said hinge means to uncover said aperture for dispensing the contents of said container by enabling said plug member to be pulled out of said aperture.

4. A removable closure cap adapted to be secured on a food or beverage tin-can container as described in claim 3, wherein said plug member having a beveled section for permitting slidable insertion thereof into the aperture in said liquid-dispensing means.

5. A removable closure cap adapted to be secured on a food or beverage tin-can container as defined in claim 1, wherein said means formed in said liquid-dispensing means and disposed between said container and said discal means comprising an annular rim integrally formed in said discal means and surrounding said aperture in said liquid-dispensing means; said annular rim being provided with a small-diameter bore extending from said aperture radially toward the center of said container top, for venting said container during disposal of its contents through said liquid-dispensing means.

6. A removable closure cap adapted to be secured on a food or beverage tin-can container as described in claim 5, wherein said annular rim surrounding the aperture of said liquid-dispensing means being doubly beveled at the internal periphery thereof and forming a constricted section extending centrally therefrom, and wherein said small-diameter bore being located at said constricted section.

7. An article of manufacture as claimed in claim 1, comprising a discal polyethylene member having a peripheral skirt terminating in an inwardly projecting annulus integrally formed therewith, an aperture disposed adjacent the periphery of said discal member, a plug member with beveled section to cover and uncover said aperture being hingedly secured to said discal member, and a collar formed integrally with said discal member and surrounding said aperture; said collar member being beveled to mate with the beveled section of said plug member to form a seal and having a bore extending from said aperture toward the center of said discal member and parallel thereto.

References Cited

UNITED STATES PATENTS 3,214,069    10/1965    Dike _____ 222—570 XR
3,262,612    7/1966    Tabor _____ 222—570 XR THERON E. CONDON, *Primary Examiner.*

G. T. HALL, *Assistant Examiner.*